Oct. 1, 1963     D. G. STRATTON     3,105,431
MOTOR VEHICLE CONSTRUCTION
Filed March 19, 1962
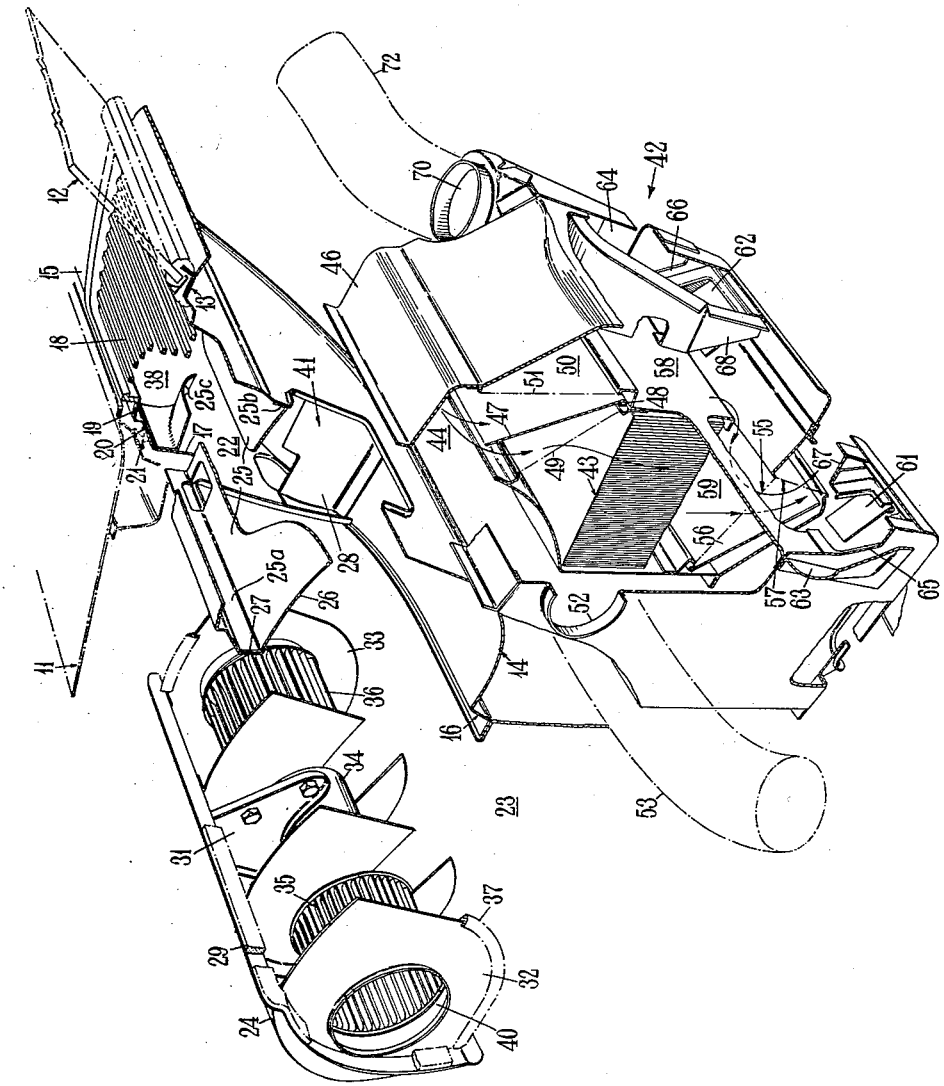
DESMOND G. STRATTON
INVENTOR
John L. Faulkner,
BY John J. Roethel
ATTORNEYS 3,105,431
MOTOR VEHICLE CONSTRUCTION
Desmond G. Stratton, Sutton Coldfield, England, assignor to Ford Motor Company, Dearborn, Mich., a corporation of Delaware
Filed Mar. 19, 1962, Ser. No. 180,738
Claims priority, application Great Britain Apr. 6, 1961
8 Claims. (Cl. 98—2)

This invention relates to motor vehicle body constructions and more particularly to arrangements within the body structure for accommodating a blower for a heating and ventilation system.

Vehicle heating and ventilation systems, in general, require a large air flow for adequate ventilation of the passenger compartment. In one known system the air flow is supplied by a bulky blower arrangement consisting of a motor and two centrifugal fans located in front of the windshielf panel and beneath the cowl top.

It is an object of the present invention to reduce the amount of space required for the accommodation of such a unit.

Accordingly, the present invention consists in a motor vehicle body construction comprising a windshield panel and a cowl panel including air inlet vents for a blower, in which a portion of the windshield panel below the cowl panel is arcuate in volute form to provide a portion of a casing for a centrifugal blower arrangement. Preferably, a deflector panel is located beneath the cowl panel above the said volute form portion of the windshield panel and is in the shape of a further arcuate portion of the same volute.

Conveniently, the outlet from the blower casing is formed between the arcuate portions at the rear thereof, and an additional blower housing, in which the blower arrangement is mounted, completes with the arcuate portions, the volute form of the blower casing.

In a preferred embodiment of the invention the air from the blower is divided into two streams. The air in either stream may be selectively proportioned, either stream being selectable as zero. One of the divided streams passes over a heater matrix, and the streams are recombined before emerging into the vehicle interior.

The invention will be further described with reference to the accompanying drawing which is a perspective view, cut away and partially exploded, of the heater and blower units and associated body panels of the preferred embodiment of the invention.

The drawing illustrates part of a vehicle having a hood top 11, a windshield 12, a windshield opening panel 13 and a cowl panel 15 having an air inlet opening covered by a grille 18.

As illustrated, the windshield supporting panel 13 extends downwardly at its center and then forwardly for a substantial part for its width. At its center this panel is formed to include at 14 a portion of volute shape. At the ends of the depression in the panel 13 it is permitted to return to a normal surface in alignment with hood 11 and level with the cowl panel 15.

Affixed to a surface 16, formed in the windshield supporting panel 13 and forward of its surface 14, is a firewall panel 17 which extends upward to terminate below the grille 18 at a step or landing 19.

A surface 20 is provided in the firewall panel 17 against which hood seal 21 impinges, thereby preventing engine compartment fumes from entering the air inlet opening grille 18. The ends of the panel 17 are affixed to panel 13, thus forming a wide central chamber 22.

A large aperture 23 is cut in the forward face of panel 17 to allow an arcuate blower housing panel 24 to be assembled thereto. Fixed between panel 17 and 13 above the said aperture 23 is an air and water deflector panel 25 which continues the required volute form at 26. One attachment flange 25a of panel 25 mates with a surface 27 of panel 17 and the other attachment flange 25b mates with the air chamber side of the panel 13. The deflector panel 25 is continued past the ends of the aperture 23 with a downwardly curving profile, as at 25c. Below the ends of the deflector panel 25 but situated close to the ends of aperture 23 is a water baffle panel 28 connecting panels 13 and 17.

A continuous seal 29 is attached to housing panel 24 which is formed to provide a further portion of the required volute shape which, when mated with the surfaces provided on panel 17, forms the shape normally associated with a centrifugal fan casing.

Affixed to housing panel 24 is a motor mounting bracket 31 and end plates 32 and 33. A motor 34 carries twin centrifugal fans 35 and 36 and is attached to the mounting bracket in a conventional manner. A sealing material capable of adjusting to manufacturing tolerances required in forming the built-in volute form is affixed to each air guide plate 32 and 33 in the form of a seal 37.

Forward vehicle motion or rotation of the fans will cause air to flow through grille 18 and into air space 38. The deflector panel 25 will cause air entering air space 38 to flow laterally toward the ends of air space 38 and panel 25 where it is caused to turn and flow toward the vehicle center line. Any moisture following the initial path of the air streams will be projected from the ends of panel 25 and on to the lower surface of the panel 13, where it will continue to flow back towards the vehicle center line until it meets baffle plate 28, and whence it flows through an orifice in panel 17 into a drain tube (not shown). Thus, air passing over the baffle plate 28 will be substantially free from moisture and will pass through orifices 40 and end plates 32 and 33 and into the fans 35 and 36.

The air is now directed rearwardly through a suitable aperture 41 in panel 13 and then sent to the heating and ventilating and air distribution unit 42 mounted against the rear face of panel 13.

The heating and ventilating unit 42 is of generally conventional construction and contains a core 43 through which hot water may be circulated.

A preferred method of regulating temperature is illustrated in the drawing. Cold air enters chamber 44 through an aperture in the heater casing 46. A damper or flap 47 pivoted on shaft 48 allows the air to enter either the core by way of aperture 49 or the cold air bypass duct 50 by way of aperture 51. When the damper or flap 47 is set in an intermediate position, cold air will flow through both apertures 49 and 51.

Communicating with the cold air chamber 44 are the ventilating outlets 52 which are connected by suitable ducts 53 to the instrument panel outlets. There may be any number of outlets 52 to suit the disposition of the fresh air outlets which may be from one to four in number depending on the layout, design and styling of the instrument panel and the position of various instruments, switches, etc., normally associated with this location.

Air flowing through aperture 49 will pass through core 43 and then through aperture 55, over damper or flap 56 and out of the distribution chamber through an aperture 57 at maximum temperature. That air which flows through aperture 51 enters a duct 58 that narrows in width from top to bottom and is allowed to discharge into space 59 immediately below the core 43. This cold air flow will therefore mix with the already heated air and thus reduce its temperature before it leaves the heater unit by way of aperture 57.

The angular movement of the damper or flap 47 therefore controls the temperature of the air discharging from aperture 57. When damper or flap 47 is fully closed and sealed against aperture 49, water flow through the core is also stoped by the closing of a valve situated in the water circuit, thus ensuring that air entering the vehicle is at ambient temperature.

Air flow to the windshield defroster outlets is controlled by flaps 61 and 62 which allow air to pass from space 59 into ducts 63 and 64 by way of apertures 65 and 66. Ducts 63 and 64 are divided from duct 58 by panels 67 and 68. The air in ducts 63 and 64 is constrained to flow through a pair of apertures such as 70 and into flexible hoses such as 72. Closure of damper or flap 56 against aperture 55 induces all the air entering the heating unit to flow to the windshield defroster outlets.

The fresh air ventilating outlets are disposed within the instrument panel in such a manner that a stream of air is directed toward each of the occupants and reaches the upper portion of the occupants' bodies at equal velocities. Air velocity control by the occupants may be accomplished by directing the main air stream above the occupants' head levels allowing only lower fringe velocities to affect evaporative cooling. In this way air velocities flowing about the occupants' head and shoulders may be reduced without reducing the total quantity of air being discharged into the vehicle.

Various modifications may be made within the scope of the invention. Thus, the heating unit may be located on the side wall of the engine compartment, and the outlet of air from the blower unit directed forwardly.

I claim:

1. In a motor vehicle body having a windshield, a cowl panel extending forwardly of said windshield, an air inlet in said cowl panel, a dash panel attached to said cowl panel forwardly of said air inlet, and an air intake chamber and blower casing structure comprising a plurality of panels:
   one of said panels extending downwardly from and then forwardly of said windshield to a juncture with said dash panel,
   said one of said panels having a section thereof arcuate in volute form to provide a first portion of a blower casing;
   another of said panels being located beneath said cowl panel having a section thereof arcuate in volute form to provide a second portion of said blower casing, this panel extending rearwardly from said dash panel toward the first panel for juncture therewith beneath said windshield; and
   a further panel having a section of arcuate shape,
   said further panel being mounted on said dash panel in cooperative relationship with the volute forming sections of said one and said another panel to complete the volute form of said blower casing.

2. In a motor vehicle body having a windshield, a cowl panel extending forwardly of said windshield, an air inlet in said cowl panel, and a dash panel attached to said cowl panel forwardly of said air inlet:
   a first panel forming part of a chamber beneath said cowl panel,
   said first panel extending downwardly from said windshield toward said dash panel and having a section thereof arcuate in volute form to provide a first portion of said blower casing;
   a second panel located beneath said cowl panel having a section thereof arcuate in volute form to provide a second portion of said blower casing,
   said second panel extending rearwardly from said dash panel toward the first panel for connection thereto beneath said windshield;
   and a third panel having a section of arcuate shape,
   said third panel being mounted on said dash panel in cooperative relationship with the volute forming sections of said first and second panels to complete the volute form of the blower casing.

3. In a motor vehicle having a windshield, a cowl panel extending forwardly of said windshield, a dash panel depending from the forward portion of said cowl panel, an air inlet extending laterally of said vehicle body in said cowl panel between said dash panel and windshield, and a blower casing in communication with said air inlet, said casing comprising:
   a first panel extending downwardly from said windshield and forwardly toward said dash panel,
   said first panel having a portion thereof arcuate in volute form to provide a first portion of said casing;
   a second panel extending rearwardly from said dash panel intermediate said cowl panel and said first portion of the casing,
   said second panel having the shape of a further arcuate portion of the same volute form as said casing first portion;
   and a third panel of arcuate shape extending across an opening in said dash panel to complete the volute form of said casing.

4. In a motor vehicle having a windshield, a cowl panel extending forwardly of said windshield, a dash panel depending from the forward portion of said cowl panel, an air inlet extending laterally of said vehicle body in said cowl panel between said dash panel and windshield, and a blower casing in communication with said air inlet, said casing comprising:
   a first panel extending downwardly from said windshield and forwardly toward said dash panel,
   said first panel having a portion thereof arcuate in volute form to provide a first portion of said casing;
   a second panel extending rearwardly from said dash panel intermediate said cowl panel and said first portion of the casing,
   said second panel having the shape of a further arcuate portion of the same volute form as said casing first portion;
   and a third panel of arcuate shape extending across an opening in said dash panel to complete the volute form of said casing;
   the longitudinal axis of said blower casing extending laterally of said vehicle body;
   said casing being provided with an air intake at least at one end thereof and an air discharge through an opening in said first panel.

5. In a motor vehicle having a windshield, a cowl panel extending forwardly of said windshield, a dash panel depending from the forward portion of said cowl panel, an air inlet extending laterally of said vehicle body across said cowl panel between said dash panel and windshield:
   a first panel extending downwardly from said windshield at least from the terminal ends of said air inlet and toward said dash panel, said first panel having a portion thereof arcuate in volute form to provide a first portion of a blower casing;
   a deflector panel extending rearwardly of said dash panel intermediate said cowl panel and said first panel, said deflector panel terminating short of the terminal ends of said air inlet and having the shape of a further arcuate portion of the same volute form as said casing first portion;
   and a third panel of arcuate shape mounted on said dash panel to complete the volute form of said casing.

6. In a motor vehicle having a windshield, a cowl panel extending forwardly of said windshield, a dash panel depending from the forward portion of said cowl panel, an air inlet extending laterally of said vehicle body across said cowl panel between said dash panel and windshield:
   a first panel extending downwardly from said windshield at least from the terminal ends of said air inlet and toward said dash panel, said first panel having a portion thereof arcuate in volute form to provide a first portion of a blower casing;
   a deflector panel extending rearwardly of said dash panel intermediate said cowl panel and first panel, said deflector panel terminating short of the terminal ends of said air inlet and having the shape of a further arcuate portion of the same volute form as said casing first portion;

a third panel of arcuate shape mounted on said dash panel to complete the volute form of said casing;

said casing being open at the ends thereof inwardly of the ends of said deflector panel to provide an air intake to the casing from the air inlet;

centrifugal blower means within said casing;

and baffle means directing the air discharge of said blower means toward said first panel portion;

said first panel portion having an air discharge opening.

7. In a motor vehicle having a windshield, a cowl panel extending forwardly of said windshield, a dash panel depending from the forward portion of said cowl panel, an air inlet extending laterally of said vehicle body across said cowl panel between said dash panel and windshield:

a first panel extending downwardly from said windshield at least from the terminal ends of said air inlet and toward said dash panel, said first panel having a portion thereof arcuate in volute form to provide a first portion of a blower casing;

a deflector panel extending rearwardly of said dash panel intermediate said cowl panel and first panel, said deflector panel terminating short of the terminal ends of said air inlet and having the shape of a further arcuate portion of the same volute form as said casing first portion;

a third panel of arcuate shape mounted on said dash panel to complete the volute form of said casing, said casing being open at the ends thereof inwardly of the ends of said deflector panel to provide an air intake to the casing from the air inlet;

centrifugal blower means within said casing carried on said third panel;

and baffle means on said third panel directing the air discharge of said blower means toward said first panel portion, said first panel having an air discharge opening therein.

8. In a motor vehicle having a windshield, a cowl panel extending forwardly of said windshield, a dash panel depending from the forward portion of said cowl panel, an air inlet extending laterally of said vehicle body across said cowl panel between said dash panel and windshield:

a first panel extending downwardly from said windshield at least from the terminal ends of said air inlet and toward said dash panel, said first panel having a portion thereof arcuate in volute form to provide a first portion of a blower casing;

a deflector panel extending rearwardly of said dash panel intermediate said cowl panel and first panel, said deflector panel terminating short of the terminal ends of said air inlet and having the shape of a further arcuate portion of the same volute form as said casing first portion;

a third panel of arcuate shape mounted on said dash panel to complete the volute form of said casing, said casing being open at the ends thereof inwardly of the ends of said deflector panel to provide an air intake to the casing from the air inlet;

centrifugal blower means within said casing carried on said third panel;

baffle means on said third panel directing the air discharge of said blower means toward said first panel portion, said first panel having an air discharge opening therein, and a distribution chamber in communication with said first panel air discharge opening.

References Cited in the file of this patent
UNITED STATES PATENTS

| | | |
|---|---|---|
| 1,643,966 | Swartwout | Oct. 4, 1927 |
| 1,825,036 | Young | Sept. 29, 1931 |
| 2,230,809 | Lintern | Feb. 4, 1941 |
| 2,800,285 | Muller et al. | July 23, 1957 |
| 2,975,696 | Jewell | Mar. 21, 1961 |